No. 862,948. PATENTED AUG. 13, 1907.
E. DE URIBE.
SOWING MACHINE.
APPLICATION FILED AUG. 29, 1905.
5 SHEETS—SHEET 1.
FIG I
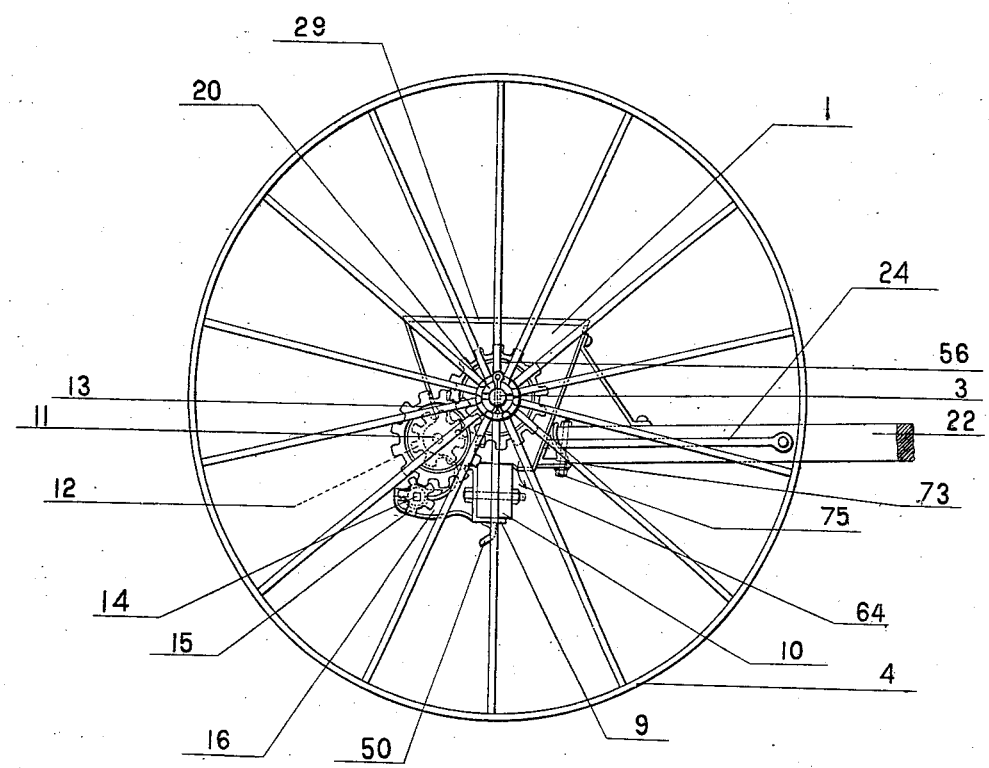
FIG II
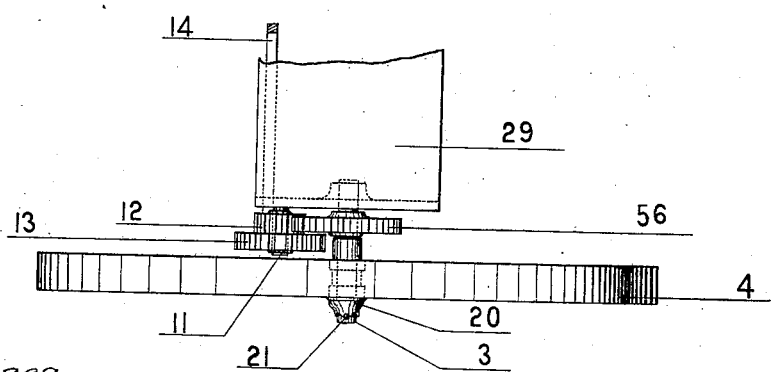
Witnesses
JHM. Kuhn
C.W. Chandler
Inventor
Enrique de Uribe
By Richards
ATTORNEYS No. 862,948. PATENTED AUG. 13, 1907.
E. DE URIBE.
SOWING MACHINE.
APPLICATION FILED AUG. 29, 1905.
5 SHEETS—SHEET 2.
FIG III
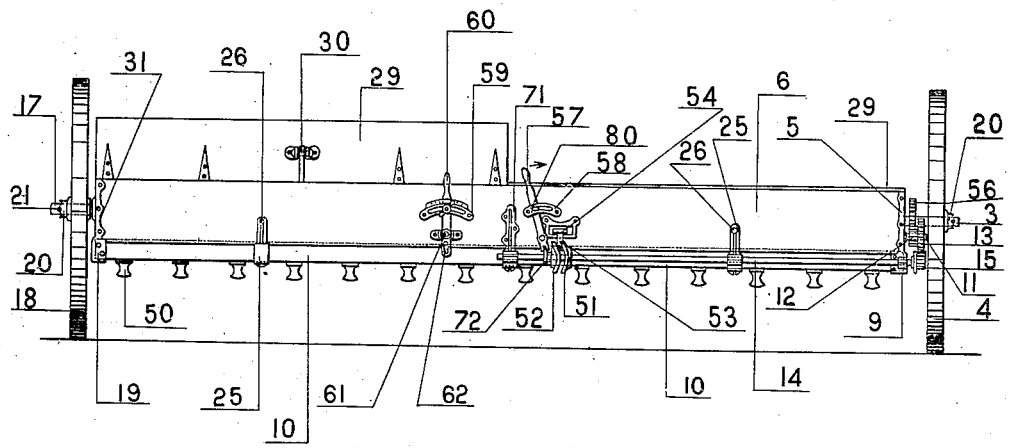
FIG IV
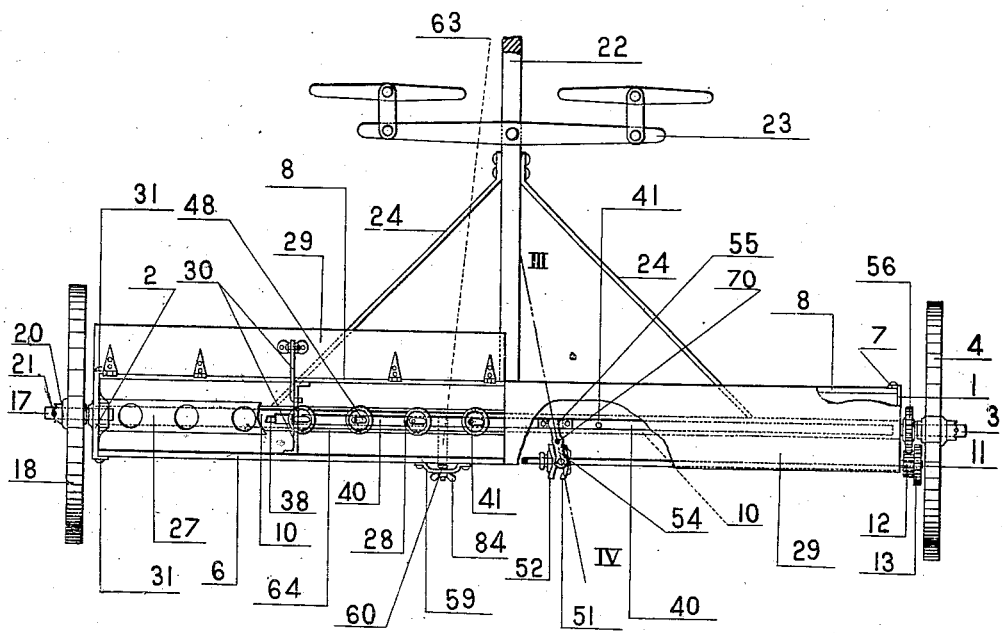
Witnesses
Inventor
Enrique de Uribe
By Richardson
ATTORNEYS.

No. 862,948. PATENTED AUG. 13, 1907.
E. DE URIBE.
SOWING MACHINE.
APPLICATION FILED AUG. 29, 1905.
5 SHEETS—SHEET 3.
FIG V
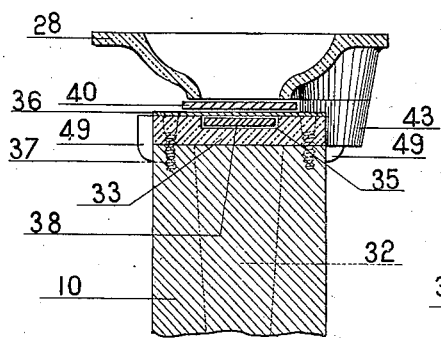
FIG VI
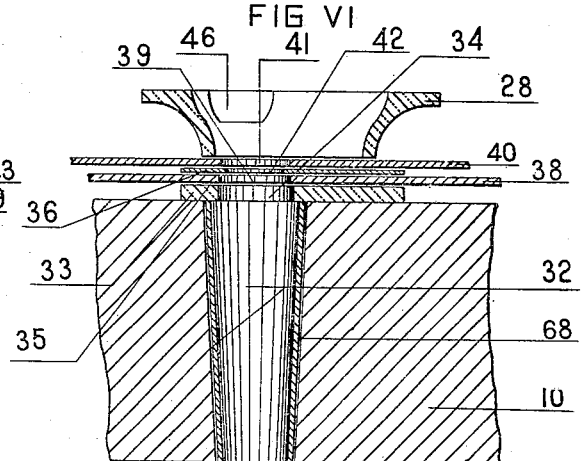
FIG VII
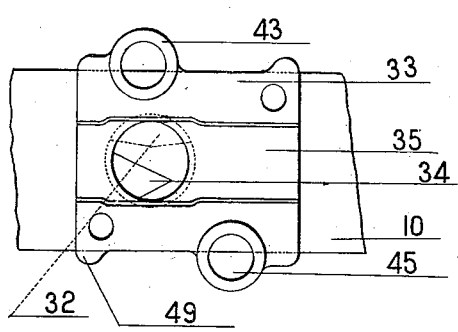
FIG VIII
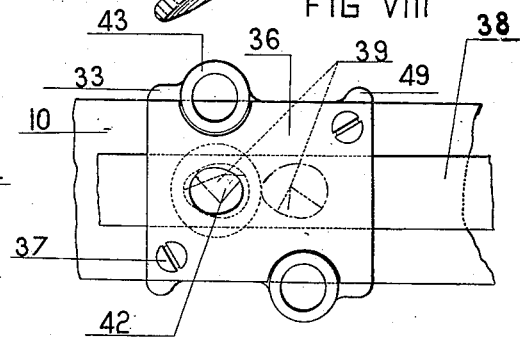
FIG IX
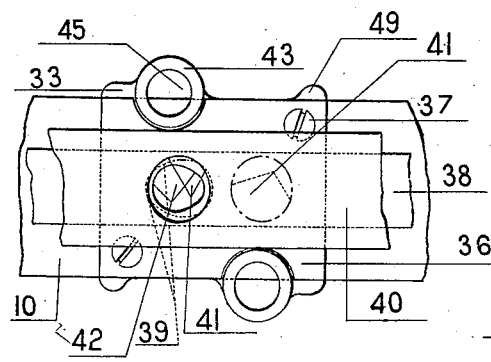
FIG X
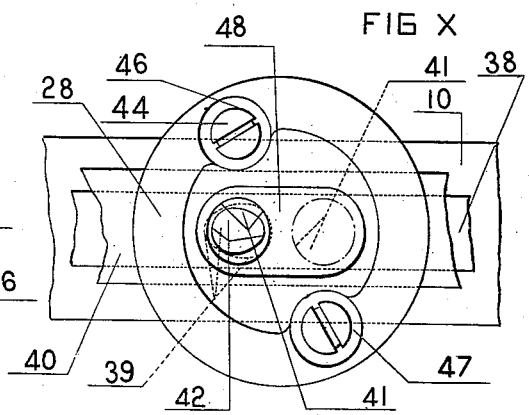
Witnesses
Inventor
Enrique de Uribe
By Richardson
ATTORNEYS No. 862,948.
PATENTED AUG. 13, 1907.
E. DE URIBE.
SOWING MACHINE.
APPLICATION FILED AUG. 29, 1905.
5 SHEETS—SHEET 4.
FIG XI
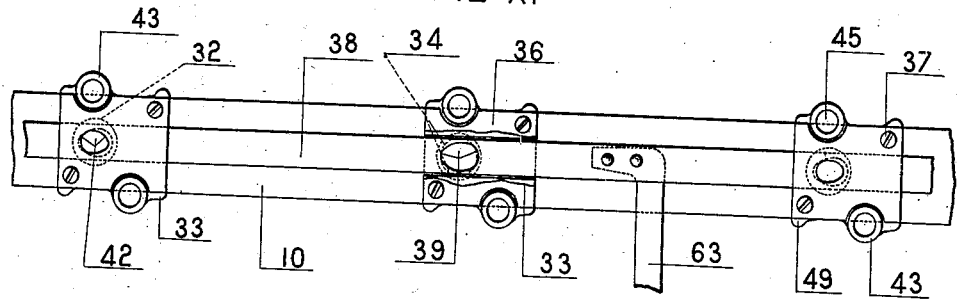
FIG XII
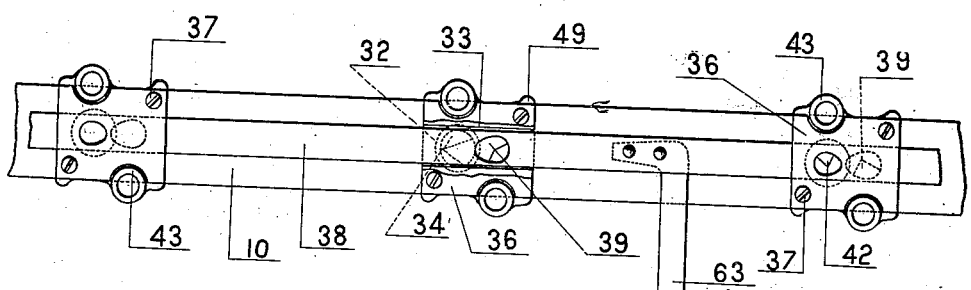
FIG XIII
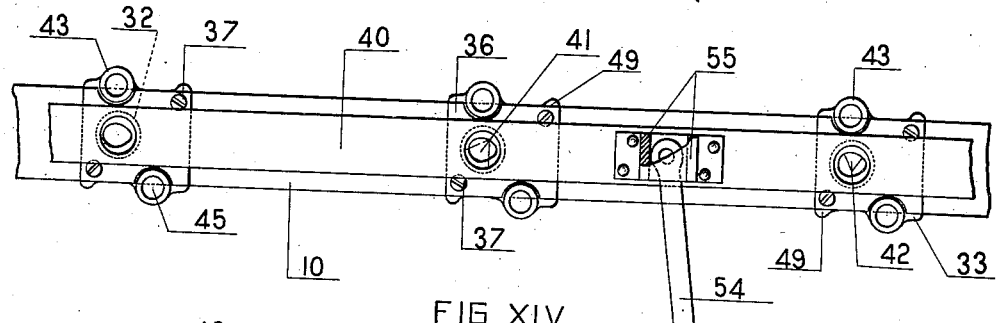
FIG XIV
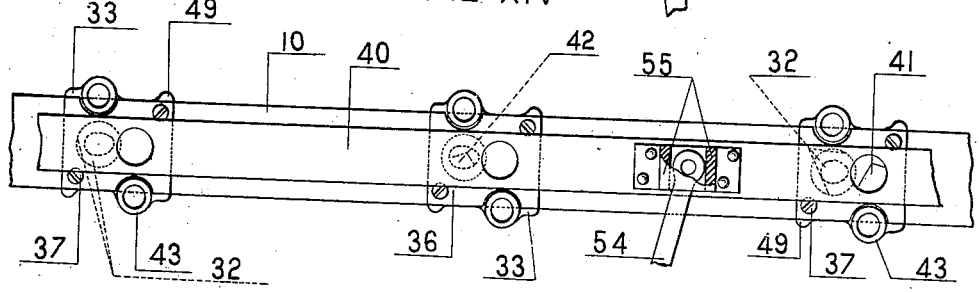
Witnesses
H. M. Kuhne
C. W. Chandler
Inventor
Enrique de Uribe
By Richards
Attorneys No. 862,948. PATENTED AUG. 13, 1907.
E. DE URIBE.
SOWING MACHINE.
APPLICATION FILED AUG. 29, 1905.
5 SHEETS—SHEET 5.
FIG XV
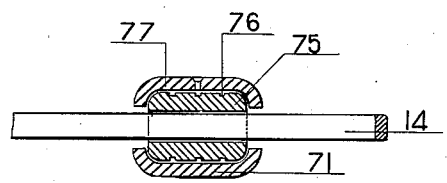
FIG XVI
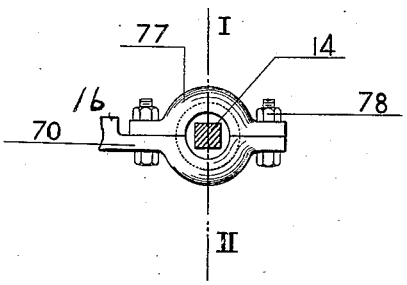
FIG XVII
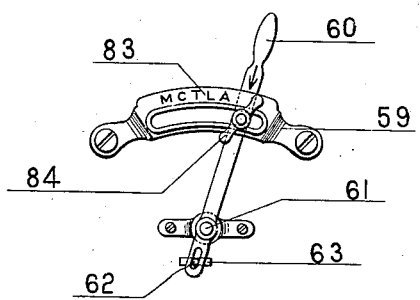
FIG XVIII
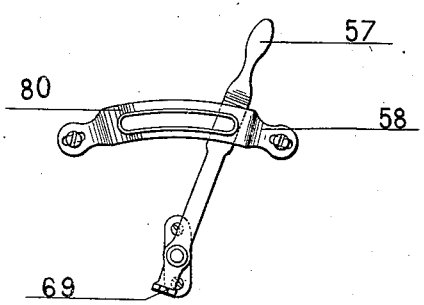
FIG XIX
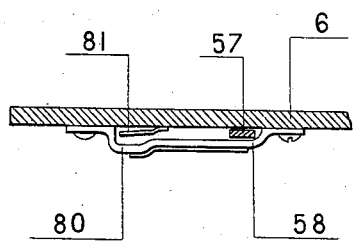
FIG XX
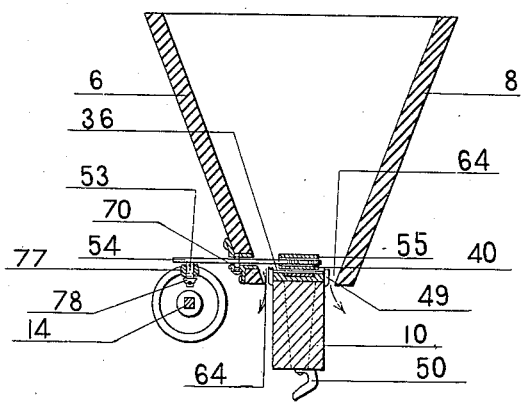
Witnesses
H. M. Kuehul
C. W. C. Chandler
Inventor
Enrique de Uribe
By Richards Jr.
Attorneys

UNITED STATES PATENT OFFICE.

ENRIQUE DE URIBE, OF BUENOS AYRES, ARGENTINA.

SOWING-MACHINE.

No. 862,948.          Specification of Letters Patent.          Patented Aug. 13, 1907.

Application filed August 29, 1905. Serial No. 276,313.

*To all whom it may concern:*

Be it known that I, ENRIQUE DE URIBE, a citizen of Spain, residing at Buenos Ayres, Argentina, have invented new and useful Improvements in Sowing-Machines, of which the following is a specification.

My present invention relates to improvements in seed drills, and I have aimed to produce a machine of extreme simplicity and durability and one which shall be exceedingly efficient in use, and with these and other objects in view the invention comprises the construction and arrangement and combination of parts hereinafter described and particularly set forth in the appended claims.

The invention is illustrated in the accompanying drawings in which,—

Figure I is a side view. Fig. II a partial plan view. Fig. III is a rear elevation. Fig. IV a general plan view. Fig. V is a transverse section of the parts adjacent one of the grain chutes. Fig. VI is a section at right angles to Fig. V. Fig. VII is a detailed view of the hopper bottom. Fig. VIII is a similar view showing a plate separating the graduating portion from the sliding bar. Fig. IX is a view similar to Fig. VIII with the parts in different position. Fig. X is a further detail of the hopper secured in place. Fig. XI is a plan view of the portion of the beam with three hopper bottoms or seats thereon. Fig. XII is a similar view with the parts in a different position. Figs. XIII and XIV are similar views of a modification with the parts shown in two different positions. Fig. XV is a section on line I—II of Fig. XVI. Fig. XVI is a side elevation of Fig. XV with the shaft in section. Fig. XVII is a detailed side view of the lever 60 with the coöperating quadrant. Fig. XVIII is a similar view of the lever 57. Fig. XIX is a sectional plan of Fig. XVIII and Fig. XX is a section on line III—IV of Fig. IV.

Referring by reference characters to these drawings, it will be observed that the machine includes a grain containing casing comprising the end pieces 1, the inclined sides 6 and 8 and the pivoted covers 29 hinged to the sides 8 and capable of being opened for the admission of the grain. The machine is mounted upon wheels 4 and 18 which are journaled respectively on shafts or axles 3 and 17 carried by the ends 1 of the casing. Rigidly connected to the wheel 4 is a driving pinion 56 through which motion is imparted to the grain feeding device in the manner hereinafter described.

From the right hand end 1 of the casing projects a bracket 16, as shown in Fig. I, to which is secured one end of the beam 10 which carries the grain feeding devices and which forms the bottom of the casing, as shown in Fig. XX. The other end of the beam 10 is supported by a bracket 19 see Fig. III depending from the other end wall 2 of the casing.

As a draft device for the machine I provide a beam 22 carrying a double tree 23 and having its rear end secured by a bolt 75 to a bracket 71 on the casing as shown in Figs. I and III, the beam being braced by the diagonal rods 24 connected at their rear ends to brackets 25 secured to the walls of the casing in a suitable manner as indicated at 26 in Fig. III.

The beam 10 is provided at suitable intervals with grain feed passages 32 which are preferably of inverted truncated cone shape and suitably lined with metal as shown in Fig. VI. Beneath the lower end of each passage is located a deflector 50 suitably secured to the under side of the beam. On the upper side of the beam and in proximity to each passage 32 is located a hopper seat 33 having a circular orifice registering with the passage 32 (see Figs. VI to VIII) and having lugs 49 depending on opposite sides of the beam. Each seat 33 is further provided with a central depression or shallow channel over which is placed a cap plate 36 secured by screws 37, and in the several spaces formed by these depressions or channels, and which are of course in line with each other is located a sliding plate or bar 38 having suitably shaped openings 39 corresponding in number and distance apart with the openings in the hopper seats. Each plate 36 has an opening 42, of course, corresponding to the opening in the hopper seat and the passage in the beam.

Above the plate 36 is located a sliding bar 40, which has suitable apertures 41, one or more for each hopper, and is guided in its rectilinear movement by projections 43 on the hopper seat, see Figs. IX, XIII and XIV, said projections having threaded openings for the reception of the screw bolts 44 by which the hoppers are secured to the hopper seats, the heads of the screws being countersunk in the mouths 46 of the openings 45. Each hopper 28 is provided with an elongated opening in its bottom, as will be seen from Figs. V, VI, and X, the length of the opening being greater than the run of the sliding bar so that the opening in the latter will always remain within the limits of the elongated opening in the bottom of the hopper.

It will be understood that the grain is fed intermittently through the feed passages by the reciprocating movement of the sliding bar 40, bringing the openings in said bar alternately into and out of alinement with the feed passages. The reciprocation of this bar is effected in the following manner. The gear wheel or pinion 56 rigidly connected in any suitable manner to the wheel 4, so as to turn therewith, meshes with a pinion 12 journaled on a short axle 11 on the end wall 1. A pinion 13 rigidly connected to the pinion 12 meshes with a pinion 15 secured on a shaft 14 journaled in the bracket 16 as clearly shown in Figs. I and II. For purposes of simplicity and economy, I prefer to make this shaft square, and secure to it a cylindrical sleeve or bushing with hemispherical ends which is held by and rotates between the lower half bearing box 70 formed on the bracket 16, and the upper half or section 77 which is secured to the lower by suitable bolts 78. The bushing or sleeve 75 is preferably provided with annular grooves or channels to assist lubrication. This shaft 14 carries a fixed cam section 51 and a longitudinally movable cam section 52, these forming, when the movable cam section is in proximity to the fixed cam section, an intervening cam groove within which projects a roller 77 held by a nut 78 on a pin 53 carried by the end of a lever 54. The lever 54 is fulcrumed on a pin 70 in a recess in the side wall 6 of the case and its inner end engages a box or clip 55 secured to the bar 40. Thus the rotation of the cam will rock said lever and impart a reciprocating movement to the bar 40.

In order that the above described operating mechanism may be disconnected to permit the sliding bar to remain at rest in position to cut off the feed, the movable section of the cam is provided with an annular flange 72 which is engaged by the forked lower end 69 of a pivoted lever 57, the upper portion of which is guided by a bracket 58. The bracket has a recess 80 at one end into which the upper portion of a lever will be pressed by the spring 81 and thereby retained in position to hold the movable clutch member in operative position (see Fig. XIX). When the lever is in the position shown in Fig. XVII, the movable cam section will be thrown to the left and the rotation of the rigid cam section will cause its high portion to force the roller 77 to the left, swinging the opposite end and with it the bar 40 into the extreme right hand position as shown in Fig. XIV, thus bringing the openings out of alinement and cutting off the feed.

In order to regulate the amount of grain fed or to adjust the device to adapt it for grains of different size or character, it is only necessary to vary the position of the slide bar 38 so as to bring the openings therein more or less nearly in alinement with the feed passages. This is accomplished by a hand lever 60 (see Fig. XVII), pivoted to the case at 61 and having a slot in its lower end which is engaged by a pin or projection 62 on a bar 63 rigidly connected to the slide 38, as shown in Figs. XI and XII. The upper end of the lever is guided by a segment shaped bracket 59 (Fig. XVII), which may bear suitable characters for designating the kind of grain, as indicated at 83, and the lever may be clamped in any position to which it may be adjusted by a thumb nut 84.

I prefer to make the openings in the plate or bar 36 and those in the bar 38 egg shaped with the narrow portions pointing in opposite directions as clearly shown on the left of Fig. XII.

Having thus described my invention what I claim is:—

1. In a seed distributing machine, a seed holding casing, wheels supporting the same, feed chutes leading from the casing, a sliding bar over the feed chutes having corresponding openings, a shaft driven from one of the supporting wheels, a cam section fast thereon, a movable cam device, a lever having one end connected with the sliding bar and the other engaging between the cam sections, and a hand lever for operating the movable cam section, substantially as described.

2. In combination, a seed containing casing, a longitudinal bar in the bottom thereof having feed passages, a seat secured to the bar in proximity to each passage, longitudinal recesses in each seat, an adjustable bar extending throughout all the recesses and having openings corresponding to the feed passages, a plate over each seat for holding the adjustable bar in place, a sliding feed bar over said plate having openings corresponding to the feed passages, and a hopper clamped to each seat, substantially as described.

3. In combination, a seed containing casing, a longitudinal bar in the bottom thereof having feed passages, a seat secured to the bar in proximity to each passage, longitudinal recesses in each seat, an adjustable bar extending throughout all the recesses and having openings corresponding to the feed passages, a plate over each seat for holding the adjustable bar in place, a sliding feed bar over said plate having openings corresponding to the feed passages, and a hopper clamped to each seat, said seat having projections for supporting the hopper and guiding the sliding bar, substantially as described.

In testimony whereof I have signed my name to this specification in the presence of two subscribing witnesses.

ENRIQUE DE URIBE.

Witnesses:
TOMAS A. LE BRETORY,
BARTOLO R. OBLIGADO.